United States Patent [19]

Mackenzie et al.

[11] Patent Number: 4,517,925
[45] Date of Patent: May 21, 1985

[54] HIGH EFFICIENCY REFUSE-DERIVED-FUEL SUPPLYING SYSTEM FOR INDUSTRIAL BOILERS

[75] Inventors: Harold B. Mackenzie, Wheaton, Ill.; Ingvar G. Anderson, Houston, Tex.

[73] Assignee: New Life Foundation, Wheaton, Ill.

[21] Appl. No.: 549,886

[22] Filed: Nov. 9, 1983

[51] Int. Cl.³ .............................................. F22B 33/00
[52] U.S. Cl. ....................................... 122/2; 110/103; 110/346
[58] Field of Search ................ 122/2, 448 B; 110/255, 110/346, 101 C, 103; 236/14

[56] References Cited

U.S. PATENT DOCUMENTS

| | | | |
|---|---|---|---|
| 3,833,117 | 9/1974 | Mackenzie et al. | 209/3 |
| 4,254,716 | 3/1981 | Graham | 110/346 |
| 4,270,470 | 6/1981 | Barnett et al. | 122/2 |
| 4,358,237 | 11/1982 | Mackenzie et al. | 414/300 |
| 4,437,419 | 3/1984 | Hertel | 110/255 X |

OTHER PUBLICATIONS

Catalog, American Fabricators, Inc. "Doffing Roll Metering Bins" Bulletin DRB-76.
Catalog, Overstrom Vibrating Conveyors Triple/S Dynamics.
Catalog, Triple/S Dynamics "Rotascreen" Rotary Screener.
Catalog, Merrick Scale Mfg. Co., "Digital Electronic Conveyor Belt Scale Merrick 460 Weightometer.

Primary Examiner—Edward G. Favors
Attorney, Agent, or Firm—Hill, Van Santen, Steadman & Simpson

[57] ABSTRACT

A high efficiency Refuse Derived Fuel (RDF) processing and supplying system for maintaining industrial boilers operating continuously at peak efficiency. The system includes equipment for efficient processing and maximum blending of diverse combustible material in municipal solid wastes into high quality, industrial grade RDF of maximum uniformity, and a plurality of RDF final processing fuel stations at least equal in number to the number of boilers to be supplied with RDF. From these fuel stations the RDF is selectively delivered at a steady, uniform, controlled rate to any of the boilers. Each station has an active storage unit, a doffing roll metering bin for attaining desired fluffiness in the RDF, a metering belt scale to achieve precise volume control of the RDF being fed to the boilers, and a trommel dryer supplied with waste heat from the boilers for drying the RDF and adapted for final removal of noncombustible fines from the RDF. At the boiler the metered RDF is divided into a plurality of uniform streams for delivery to each RDF fuel feed port leading into the boiler. Stream dividing is effected by a divider having an anti-clogging device.

22 Claims, 10 Drawing Figures

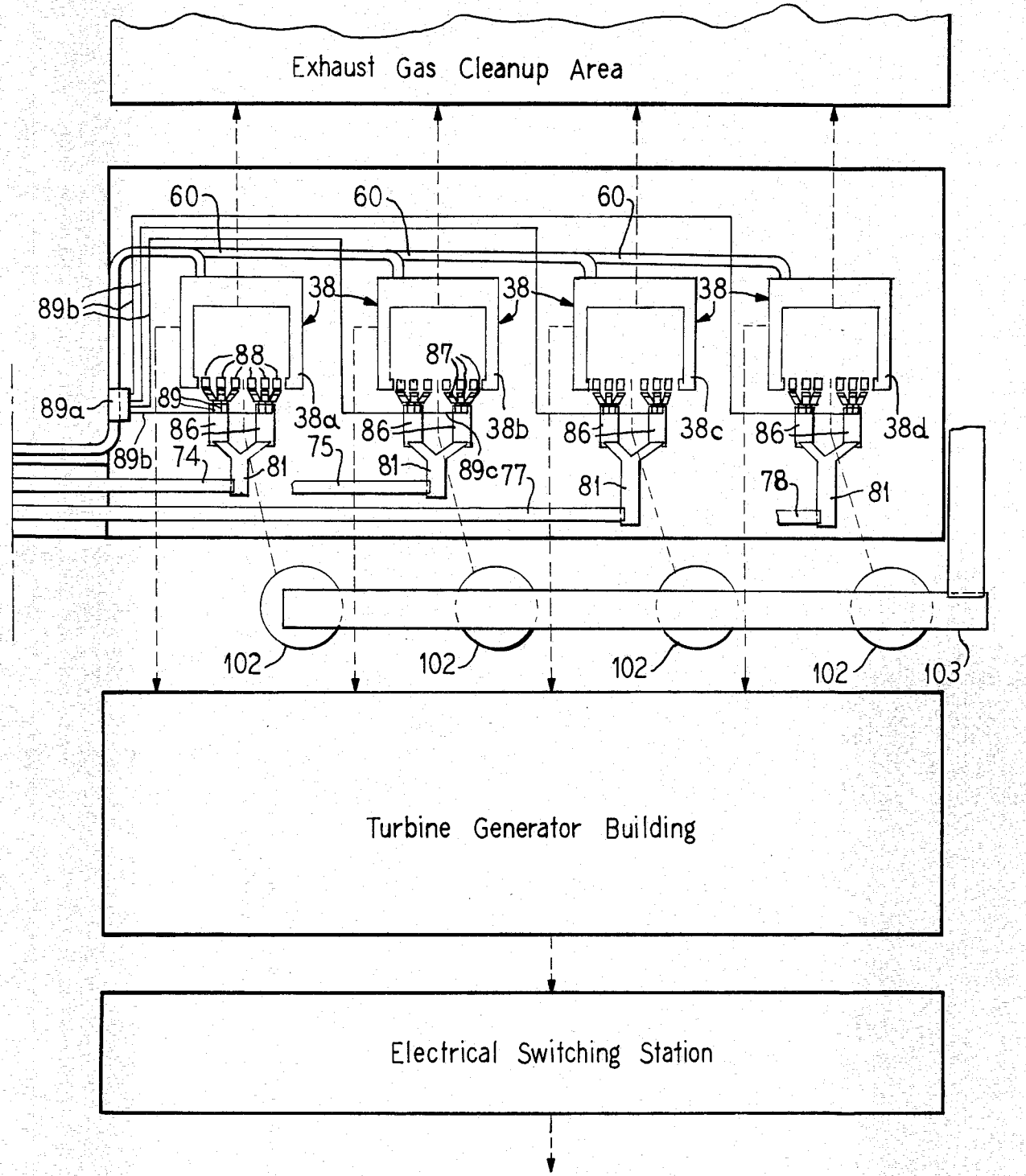

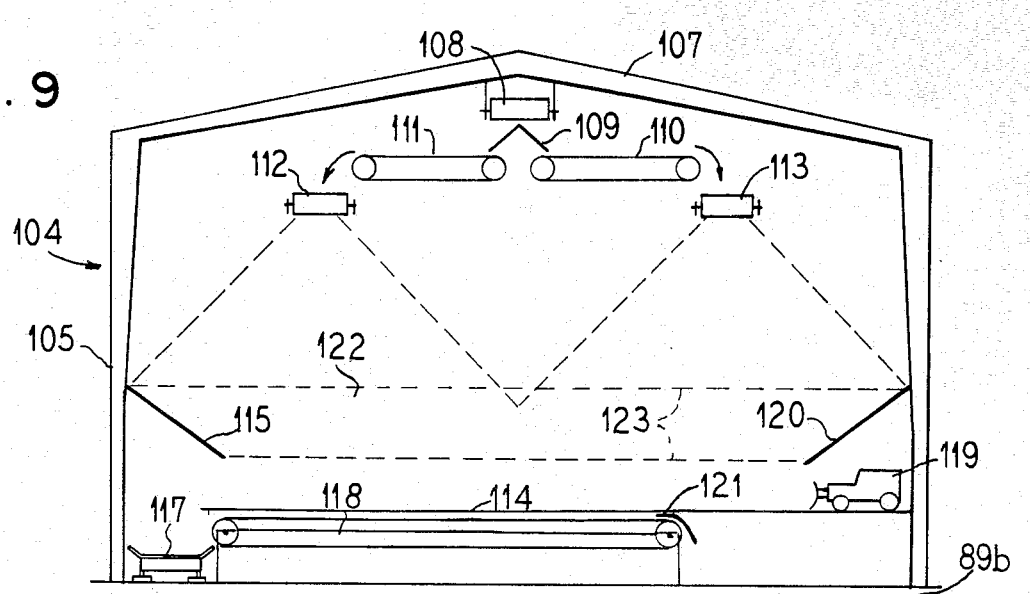
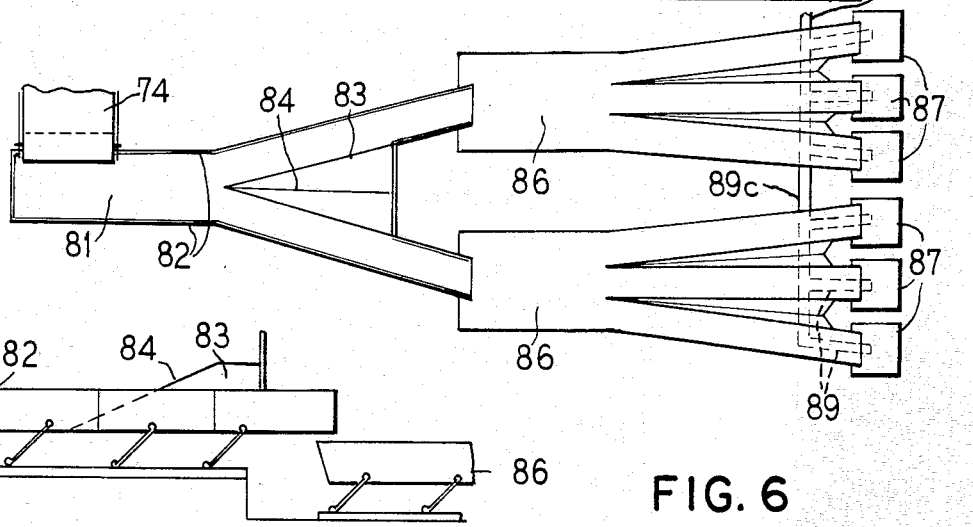
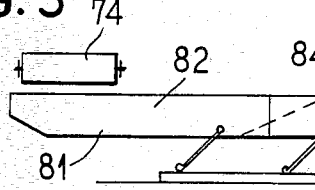
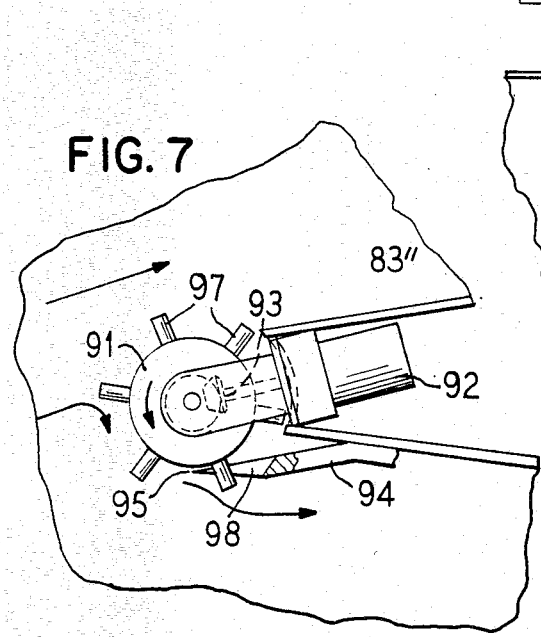

HIGH EFFICIENCY REFUSE-DERIVED-FUEL SUPPLYING SYSTEM FOR INDUSTRIAL BOILERS

This invention relates to the utilization of refuse-derived-fuel (RDF) for firing high efficiency industrial boilers from which the steam may be utilized for various industrial purposes such as, but not limited to, process steam use, or driving electrical generator turbines, and is more particularly directed to the attainment of continuous boiler operation at peak efficiency using such fuel.

Municipal and industrial wastes have generally been disposed of as landfill or by incineration, the latter in recent years often used to produce low quality steam. In general, the incineration systems have had as their objective primarily to reduce the volume and reduce the weight of the raw wastes to conserve landfill space and incidentally to achieve what steam energy is reasonably possible. Basically, these prior systems have consisted of typical mass burning incinerators with either waste heat recovery boilers or with water wall boilers built around them. Feeding of the incinerator-type boilers has generaly been effected by dumping the raw wastes from the collector trucks into large pits, and then transferring the raw waste from the pits to feed chutes of the incinerator by large claim-shell buckets operated by traveling bridge cranes. The incinerator residue, containing ash from the burned combustibles as well as all of the non-combustibles, is discharged into an ash pit, very often if the wet, or "quench" type, and is then transfered into trucks for hauling to landfill. Energy production, i.e. steam, in such systems lacks efficiency, and steam output can be very irregular due to the inclusion in the waste mass of incombustible and wet materials indiscriminately, producing an irregular BTU feed and robbing BTU content in the combustion zone. Steam produced by incinerator boilers is generally unsatisfactory for high efficiency operation of generator turbines where the aim is to produce steam of the highest pressure and temperature reasonably possible and to control the steam output to very close to a rated or specified capacity. Unless the fuel fed to the boilers can achieve within 3% to 5% of the prescribed steam output, electric power generated from such steam and the value of such power to a utility will be substantially reduced. We are aware of such a mass burning incinerator boiler installation designed for a capacity of 200,000 pounds of steam where at times no more than 160,000 pounds is attainable because of the poor grade of fuel going into the incinerator, and sometimes the steam output drops from an output of 160,000 pounds per hour to as low as 120,000 pounds per hour, and such drop may occur within a 5 minute interval. This would be disastrous for generator turbine operation, due to the extreme fluctuations of power going into a utility grid system.

Municipal solid waste typically comes from one of two main sources. One such source of municipal solid waste is from mainly residential areas and contains all sorts of incombustible materials such as tin cans, glass, soil, building materials such as bricks and plaster, cement blocks and debris of various kinds as well as various discarded appliances and hardware items, and the like. Much of the residential waste materials also have a high moisture content, especially at some periods of the year. Bags of wet grass will be 50 to 60% moisture. Bags of yard trash and cans of yard trash may contain food wastes and materials fairly saturated with moisture from weather conditions. Since the moisture content is generally rather high and the amount of noncombustible material is relatively high, the BTU value is generally low. However, in most waste to energy installations this is the sort of waste material that comprises at least a sZubstantial volume of the waste material.

The other principal source of municipal solid waste is from commercial and industrial sources and apartment and condominium complexes, which normally are much dryer, have a lower percentage of non-combustibles, and contain combustibles of considerably higher BTU values than waste materials from residential sources. When the fuel stream is composed of primarily dry, highly combustible materials and then these materials are followed by high moisture, lower combustible materials, combustion efficiency is correspondingly lowered, resulting in wide and very undesirable fluctuations in steam output efficiency.

Some other waste to energy systems attempt to overcome the deficiencies of mass burning for higher efficiency industrial steam production. Such other systems include what are known as "shred and burn" systems, and some others attempt some removal of some non-combustibles in the waste stream. However, none of these other systems have the technology to produce a high quality industrial grade RDF fuel by achieving maximum removal of non-combustibles and substantial reduction of moisture. Above all else these other systems do not achieve the planned uniformity of the RDF product, the uniformity and control volume of the RDF being fed to the boilers, nor the uniformity of the RDF fuel streams being fed to each RDF fuel port of the boiler, all of which are essential to high efficiency industrial steam production, and which are achieved by this invention.

An important object of the present invention is to provide a new and improved high efficiency Refuse-Derived-Fuel boiler fuel supplying system which is especially adapted to maintain one or a plurality of industrial boilers operating continuously at peak efficiency, and which will overcome the disadvantages, drawbacks, inefficiencies, shortcomings, limitations and problems inherent in prior arrangement for utilizing RDF.

Another object of the invention is to provide high efficiency industrial boilers with RDF of such high quality and uniform distribution to the boilers that peak efficiency is continuously maintained.

A further object of the invention is to provide a high efficiency RDF supplying system for maintaining a plurality of industrial boilers operating continuously at peak efficiency, and adapted for supplementation with a fossil fuel source to maintain rated steam production RDF if the RDF supply or the BTU value of the RDF has any fluctuation or interruption.

Still another object of the invention is to provide a system of the character indicated which is simple, efficient, and adapted to be as closesly associated as practical with an industrial boiler installation.

To this end, the present invention provides a uniform, high quality refuse derived fuel (RDF) supplying system for maintaining a plurality of industrial boilers operating continuously at peak efficiency, and comprising a plurality of RDF storage units at least equal in number to the number of boilers to be supplied with RDF, means for loading RDF from a source into said storage units, and means for selectively delivering the RDF from any of said storage units to any of the boilers.

This invention also provides a uniform, high quality refuse derived fuel (RDF) supplying system for maintaining a plurality of industrial boilers operating at peak efficiency, and comprising providing a plurality of RDF storage units at least equal in number to the number of boilers to be supplied with RDF, loading RDF from a source into said storage units, and selectively delivering the RDF from any of said storage units to any of the boilers.

In certain aspects the invention is adapted for single boiler firing at high efficiency with RDF.

Other objects, features and advantages of the present invention will be readily apparent from the following description of certain representative embodiments thereof, taken in conjunction with the accompanying drawings, although variations and modifications may be effected without departing from the spirit and scope of the novel concepts embodied in the disclosure, and in which:

FIG. 1 is a schematic illustration of an efficient arrangement for processing RDF in the system of the present invention;

FIGS. 2A and 2B, together, are a schematic illustration of RDF supplying arrangement for the system of the invention;

FIG. 4 is an enlarged fragmentary top plan view of a non-clogging means at each of the boilers for attaining uniformity of RDF fuel feed to each fuel feed port of the boiler;

FIG. 5 is a side elevational view of the apparatus shown in FIG. 4;

FIG. 6 is a fragmentary top plan view of another non-clogging means of uniform splitting of the fuel stream splitter;

FIG. 7 is a view similar to FIG. 6 but showing another modification of the splitter;

FIG. 8 is still another modification of the splitter; and

FIG. 9 is a schematic vertical sectional detail view showing a modification in the RDF storage and supply building.

As contemplated herein, the refuse derived fuel (RDF) has been processed for maximum electrical energy recovery. All, except possibly some fines, of the non-combustible materials, such as tin cans, glass, dirt, plaster, bricks, cement blocks, automobile parts, bicycles, water softeners, discarded household appliances, have been removed and a reasonably uniform shredded RDF product is provided to attain the most uniform combustion quality in the RDF and thus uniform steam flow out of the boilers to which the fuel is delivered, and to avoid undesirable steam output fluctuations which would be reflected in undesirable fluctuations in electrical power generation. By maintaining a plurality of industrial boilers operating continuously at peak efficiency, steady, uniform electrical power load adapted to be is fed into a receiving power grid such, for example, as an electrical utility purchasing the electrical power output.

By way of example of how important it is to electrical utility system to attain uniform, nonfluctuating power generation, it may be mentioned that where such a utility system uses coal for steam production, if the coal is derived from different sources and varies in BTU value, or has different volatility values, flash points, or different sulfur contents, different iron content, or the like, the coal from different sources will be maintained in separate stockpiles in the utility yard and will be blended. The poorer grade of coal will be blended with the higher grade of coal so that a maximum degree of prescribed uniformity will be maintained in the fuel streams to the utility boilers.

To similar effect, the RDF must be thoroughly processed to attain the maximum attainable overall uniformity, although derived from various sources. To this end, an as uniformly homogenous RDF product as possible is required. A blend of solid waste from various municipal sources may comprise residential waste having relatively high moisture content, and relatively high volume of non-combustible material and therefore lower BTU value. This waste is blended with another major source of municipal solid waste derived from commercial and industrial sources, apartment complexes and condominiums where primarily dry trash is collected such as paper, packaging materials, discarded clothing, and the like, having relatively low moisture content and high BTU value. The waste from these sources is trucked to a processing point where the waste material is classified by removing as much as reasonably possible of incombustible materials, RDF from the various sources is blended, shredded, dried to a reasonable extent and accummulated in large enough volume to provide a steady supply of RDF of maximum combustibility and uniformity to the industrial boilers.

Figure 1:
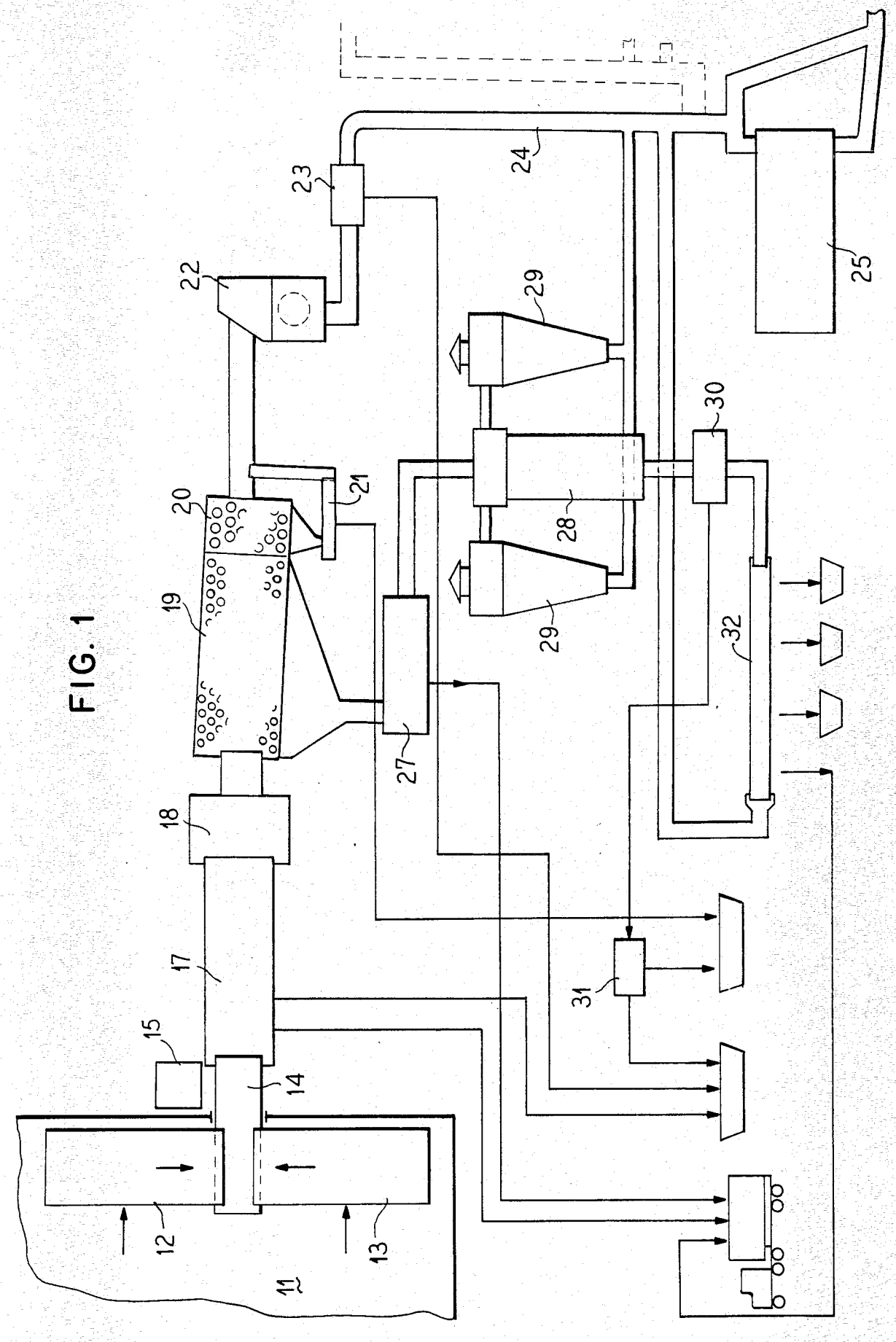

These important results are attained by means of the arrangement schematically depicted in FIG. 1. Raw municipal waste is delivered by the collector trucks to a receiving building 10, which contains a large tipping floor 11. Although only one waste processing line is shown, the tipping floor may contain a large enough area to serve two or even three waste-processing lines. Each processing line comprises two steel apron conveyors 12 and 13 within the tipping floor area. Each conveyor 12 and 13 is desirably of a capacity to contain approximately 100 tons of incoming raw municipal waste. One of these conveyors 12 is designated to receive waste from primarily residential sources, and to discharge onto vibrating conveyor 14. On the opposite side of the conveyor 14 from the residential waste receiving conveyor 12 is the second similar steel apron receiving conveyor 13 also discharging onto the vibrating conveyor 14. Receiving conveyor 13 is designated to receive primarily commercial and industrial municipal solid waste and solid waste from large residential apartment and condominium complexes. Both of the receiving conveyors 12 and 13 are controlled by the operator in a control center 15. He is able to operate both conveyors 12 and 13 simultaneously, or he may operate them intermittently, for example operating the conveyor 12 containing residential waste for perhaps a minute or two minutes and then operating the receiving conveyor 13 containing the commercial and industrial waste for an equal period. The objective of this operation is to commence at the very outset the important blending operation of this whole system, so that as the waste progresses through the system there is a blending and intermingling of the low BTU, high moisture waste with the non-combustible materials with the high BTU value, low moisture waste containing the largest amount of combustible materials and the greatest energy values.

The wastes are delivered in their intermingled form from the vibrating conveyor 14 to a manual inspection and separation area or station 17. Here pullers are stationed to pull non-combustible materials which have no commercial value such as rolls of carpet, mattresses, overstuffed furniture, water softeners, etc. which are discarded by householders. They also remove potentially dangerous toxic and dangerous materials, explosive materials such as flares, propane tanks, cleaning fluid containers, cases of dynamite, rat poison, etc. which can be thrown away from both residential and commercial sources. All of these are directed to landfill disposal. The pullers at this station 17 also remove large ferrous items such as bicycles, lawnmowers, appliances, etc. which have value in the scrap industry but are not desirable for RDF purposes.

Following the manual inspection station 17 the wastes in the course of processing pass through a ripper 18 which rips open bags of garbage, closed boxes, etc. to insure that all of these materials are processed most effectively in a primary trommel 19 which immediately follows the ripper 18. The primary trommel is a large cylindrical piece of equipment, perhaps 14 feet in diameter by 60 feet in length, and is placed at a slight downstream incline from the horizontal. Equipment of this type is available commercially, such as the Roto Screen equipment manufactured by Triple/S Dynamics Company of Dallas, Tex. Approximately the first 90% of the trommel shell will be perforated with holes about $4\frac{1}{2}$ to 5 inches in diameter, through which more than 50% of the incoming raw waste will pass as trommeled undersize. The remaining 10% of the trommel shell, indicating at 20 at the lower discharge end of the shell, will be perforated with substantially larger holes, perhaps 9 to 10 inches, which have as their objective removing items too large to pass the $4\frac{1}{2}$ inch holes, and which are intended to include such items as glass jugs for containing vinegar or cider, large gallon tin cans from restaurants, etc. The undersize material stream from the 10 inch hole section will pass a small manual separation section 21 where items such as large glass bottles, large tin cans and large plastic containers are removed manually. The remainder of the material through the 10 inch hole section is returned to the oversized material discharged from the trommel and proceeds to a shredder 22. The shredded material discharged from the shredder then passes under a strong electromagnet 23 to remove any ferrous materials that might have been contained in the large trommel oversize material which went to the shredder 22. After passing the magnet 23, this shredded waste proceeds to a fuel stream conveyor system 24 which collects all of the RDF being processed and passes out of the processing building either to the boiler fuel station system or to a reserve storage building 25.

Returning to the standard trommel 19 undersize section from which material has passed through the $4\frac{1}{2}$ inch holes in the trommel, this undersize material passes over a roll screen 27 which removes for landfill any material of a $\frac{1}{4}$ inch size or less, and containing a great deal of the dirt, fines, small particles of glass and other fractions of the wastes which are generally inert, have no commercial value and no fuel value, and which tend to contaminate the fuel. The oversize material from the roll screen then passes through an air classifier 28 such as disclosed in U.S. Pat. No. 3,833,117 and which will have a capacity of approximately 60 tons per hour and can handle all of the undersize passing from the largest-size trommel which would be used. In this air classifier 28 the lightest material which is composed of paper, light cardboard, rags, plastic, leaves, grass and similar materials and is almost 100% combustible and is usually quite dry, passes to cyclones 29 which drop the light combustible materials out of the air stream and which are then also conveyed to the fuel stream discharge conveyor 24. The exhaust air from the cyclones is recirculated to the bottom of the air classifiers and is used repeatedly for this operation.

The "heavies" fuel stream from the air classifier is conveyed underneath a strong electromagnet 30 which removes ferrous material. The ferrous fraction is conveyed through an air knife 31 which separates the tin cans from the other ferrous tramp material, both of which have commercial markets and both of which are very marketable under the system disclosed herein because the light rags, plastic, paper, etc. which are oftened trapped with the metal in other systems, particularly "shred and burn" systems, have all been removed by the air classifier 28 before the magnetic separation.

The non-ferrous waste stream passing from the electromagnet 30 is then conveyed to a manual separation area 32 where non-ferrous metals, glass, plastics and some landfill materials are manually removed. The waste stream remaining after this manual separation process is primarily combustible, containing items such as shoes, wood, very heavy cardboard, etc. small enough to pass through the small holes of the trommel 19 but heavy enough to also pass through the air classifier 28 in the heavies stream. This final combustible fraction is also conveyed to the RDF fuel stream passing from the processing building either to the large reserve storage building 25 or to boiler fuel stations for immediate combustion in the boilers.

It should be remembered that in the preparation of industrial grade fuel, uniformity is exceptionally important. Whether the fuel is high grade, medium grade or low grade, boilers can be adapted to fire it effectively. The most important thing is that the fuel stream reaching the boilers, whatever that fuel is, be of a uniform quality, as well as being fed uniformly. By the present invention, very superior uniformity of the RDF fuel stream is accomplished by the following steps:

1. The blending or combining of the waste stream from residential sources described above with the waste stream from the commercial, industrial and large residential complexes, to commence immediately the blending and intermingling of these two very diverse waste streams.

2. The mixing of these two streams which commences on the vibrating conveyor 14 which shakes and combines these materials.

3. The passing of the entire combined waste stream over the manual separation section 17 where large non-combustible items are removed.

4. Passing the entire incoming waste stream through the ripper 18 which again tends to mix the materials to some extent but at any event insures that all of them are open and freely intermingled in the trommel 19.

5. Use of the large primary trommel 19 which rotates and within which all of the incoming material is lifted in the rotation of the trommel and then dropped through the air space in the trommel achieving tremendous mixing.

6. Passing the trommel oversize materials through a shredder 22 which again takes all of these large materials and shreds them whether they are tires, boxes, wood pallets, hose, tree branches, etc., and discharges a shredded mixture which has been further substantially mixed at this point.

7. The roll screen 27 handling the smaller undersize from the trommel and separates out the largest percentage of the dust, dirt, grit, small glass particle, sand, etc. for landfill, and removing this useless material from the fuel stream.

8. Use of the air classifier 28 which is a superior piece of equipment for mixing, blending and tumbling by air of the light combustible stream fraction.

9. The use of magnets and manual separation of the heavies classification stream to remove non-combustible items which have traveled through the small undersize section of the trommel 19 and through the heavy stream from the air classifier.

10. Combining of the three separate RDF streams, namely from the shredder 22, the air classifier 28 and the manual separation section 32 into one single RDF stream through 24 and which then either passes directly to fuel stations where it is further processed and fed to one or more boilers, or to the large storage building 25 where it is stored temporarily until required for firing in the boilers when fresh supplies of raw waste materials are not coming in, as over weekends, and the processing plant is not operating. The reserve storage building 25 is a very large building as disclosed in U.S. Pat. No. 4,358,237. In a large plant, this building may be larger than a football field in floor area, and may contain over 4,000 tons of RDF, adequate to fire three 300,000 pound-per-hour boilers from Friday night when incoming raw material is interrupted, continuously until the next Monday morning when the processing plant again commences operations.

From the one or more processing lines, desirably located as closely adjacent to the point of utilization as practicable, namely, the boilers to be supplied with the RDF, the RDF is adapted to be moved by one or more transfer conveyors 35 (FIG. 2A) to a fuel station having a plurality of smaller active RDF storage units 37 at least equal in number to the number of boilers 38 (FIG. 2B) to be supplied with the RDF.

In a preferred arrangement, the conveyors 35 deliver the RDF to a dual conveyor system 39 through pantsleg or flop-gate diverters 40 so that the RDF from either of the incoming conveyors 35 can be diverted to either of the conveyors 39. The conveyors 39 are in turn equipped with flop-gate diverters 41, so that the RDF stream from either conveyor 39 can be discharged into the RDF storage unit 37 beneath it, or can be diverted to the next following RDF storage unit 37. This arrangement provides important and necessary flexibility to the RDF supply system where multiple boilers and multiple final RDF fuel stations are involved.

Figure 2A:
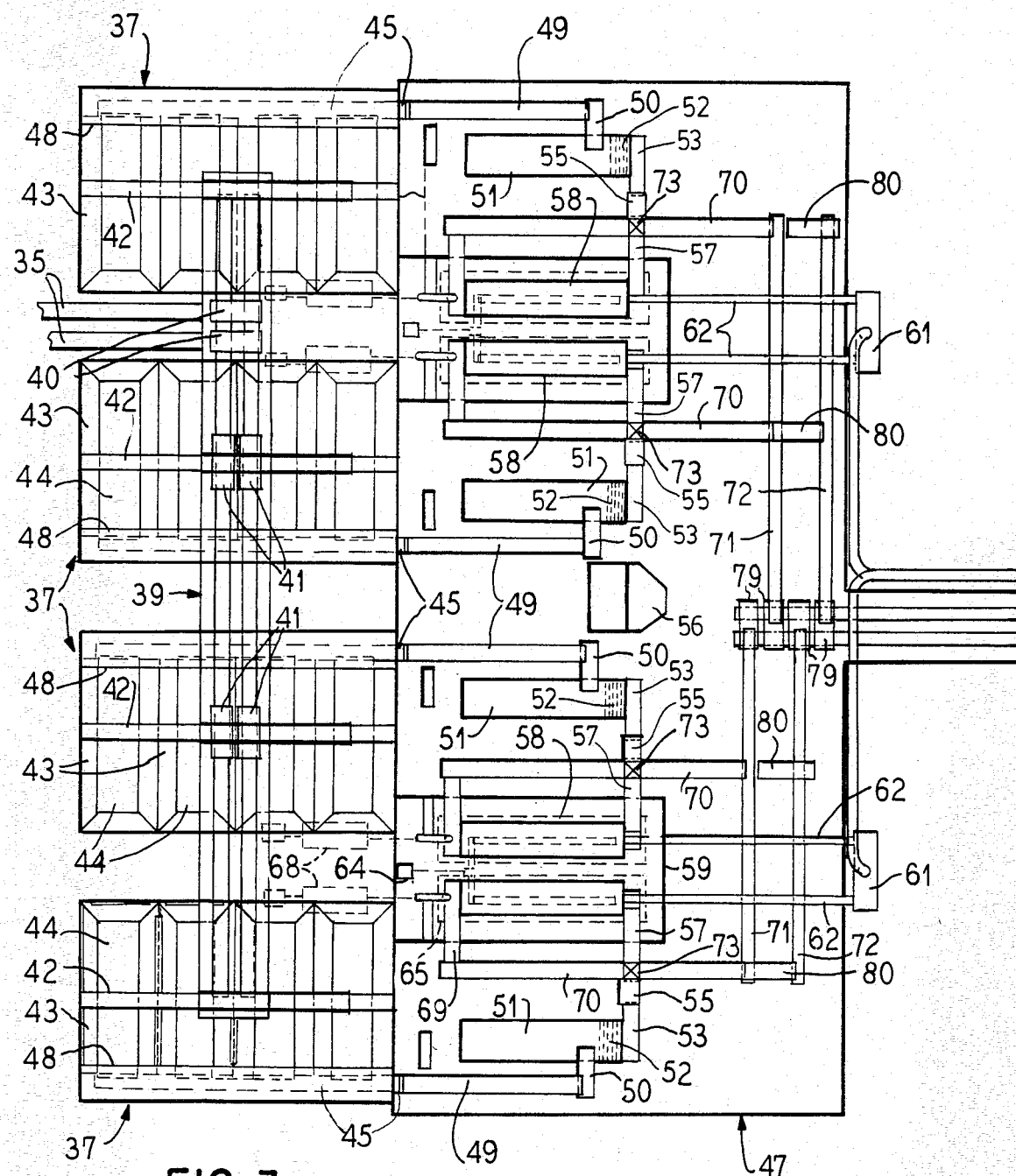

Each of the active storage units 37 must maintain a desired constant supply of RDF for steady, uninterrupted supply of RDF to the boiler which each unit is then supplying. Each of the storage units 37 may embody structure as disclosed in the aforesaid U.S. Pat. No. 4,358,237, and more particularly that form of storage building adapted for fully automatic operation providing adequate bin space for the intended purpose. Within the upper part of each of the active storage units 37 there is a cross conveyor means 42 to which RDF is directed from the conveyor system 39 for loading the storage unit 37. At the bottom of the bin space provided by the storage building a distribution floor has a series of shallow, sloping-sided bin structures 43 with bottom drag flight conveyors 44 delivering the RDF material to a takeaway conveyor 45 associated with each of the storage units 37, and delivering the RDF to a processing fuel station building 47. The drag flight conveyors with their sloping sides form shallow bins, four of which are shown in FIG. 2A. For a more detailed understanding of the storage units 37, reference to U.S. Pat. No. 4,358,237 may be had, and the disclosure of that patent to any extent necessary is incorporated herein by reference.

The takeaway conveyors 45 of each storage unit 37 are protected from overloading during the filling or loading phase by an overhanging roof surface projecting from the side wall adjacent to the takeaway conveyor, the lower edge of which roof surface is shown in FIG. 2A as 48. If the takeaway conveyor were not so protected during the loading or filling phase it could become over-loaded and would simply slip underneath the load of fibrous RDF overhanging it, and would be unable to move this load through the discharge part for the takeaway conveyor 45 into the building 47 for loading onto the elevating conveyor 49.

For final processing and metering of the RDF fed from each of the storage units 37 by its takeaway conveyor 45, there is a steeply elevating conveyor 49 which feeds onto an infeed conveyor 50 which discharges toward and into the front of a doffing roll metering bin 51 which may be of the type used in the forest products industry to handle and meter forest products materials such as wood chips, shavings, sawdust, sanderdust, etc, and which is a satisfactory apparatus for handling the shredded, fairly fluffy RDF material and improving its fluffiness. Such equipment is commercially available, and by way of example the Doffing Roll Metering Bins offered by American Fabricators, Inc. of Woodburn, Oreg., are referred to. The bin 51 may, in a practical installation, be about 10 feet wide and 60 feet long, and 16 feet high supported on a plurality of legs. At the top of the bin 51 into which the infeed conveyor 50 discharges, there are four large auger screws running the length of the bin. The incoming RDF material falls through these auger screws until it reaches the top of the bin space. As soon as the material reaches the top of the bin space, these auger screws start moving the incoming material toward the rear of the bin, and this proceeds until the bin is completely full. At this point automatic cut-off sensors function and material intake is shut off. At the bottom of the bin is a drag flight conveyor running the length of the bin 51, and which carries the material toward the front of the bin where there will be a bank of vertical and generally rearwardly inclined doffing rolls 52 of which there may be eight. These doffing rolls have projections thereon and are rapidly rotatably driven, ripping apart the clumps of the RDF which customarily form in storage and throwing the loosened and fluffed RDF material against a shield which drops it down onto a collector conveyor 53 toward which the bank of doffing rolls is sloped.

In doffing rolls manufactured for the forest industry, the doffing roll bin side walls are vertical, but in an improved version particularly adapted for RDF handling, the side walls should be negatively inwardly toward the top of the bin, so that as the RDF settles in the bin, side pressure of the RDF against the sides of the bin walls will be substantially reduced. The side drag of the RDF against the sides of the bin will be much reduced, and the drag flight conveyor in the bottom of the bin can move the fuel load in the bin more steadily and more positively into the doffing rolls 52. Also in normal commercial doffing roll bins the bottom drag flight conveyor is an ordinary commercial unit. In a further improved version especially adapted for RDF handling use, the drag flights should be equipped with intermittent large spikes sticking up into the RDF bed, and helping to assure that the entire RDF mass in the bin will move smoothly and uniformly into the entire bank of doffing rolls.

The smaller storage units 37 are designed to operate on the first-in-first-out principle covered in U.S. Pat. No. 4,358,237, the unloading commencing at the same end of the unit as the end where the loading commenced. However, the smaller units 37 operate automatically. When a sensor on the doffing roll bin 51 indicates that the RDF load in the bin has been emptied to the point where the bin should be refilled, the doffing roll bin feed system, i.e., one of the conveyors 44 and conveyors 45, 49 and 50, will all commence operating. The drag flight conveyor 44 which was discharging when bin feeding last stopped is the one which will start again. When it has finished discharging the RDF burden above it, sensor will automatically cause the next drag flight conveyor 44 in sequence to commence discharging, etc., until the fourth drag flight conveyor 44 in sequence has completely discharged its RDF burden. By this time refilling of the entire storage unit 37 will have commenced from feed conveyors 35 and 39, and the first drag flight conveyor 44 will again have a burden of RDF from which it can again commence to feed the doffing roll bin 51.

By the present invention an improvement over ordinary drag flight conveyors is also made, in that lengthy upwardly extending spikes are placed intermittently on the conveyor sections to extend up into the overhanging burden of RDF above the drag flight conveyors 44, which burden of RDF tends to cling in clumps, wad up, and bridge. The spikes tear into the overhanging RDF mass, break it loose, prevent the bridging, and insure a continuous flow of RDF into the doffing roll bins 51.

Figure 3:
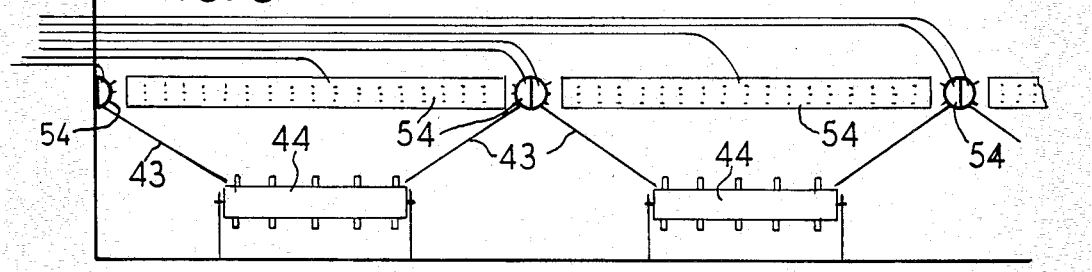
FIG. 3 is an enlarged sectional detail view taken substantially along the line III—III of FIG. 2A.

Another improvement, shown in FIG. 3 herein, to facilitate the automatic operation of the storage units 37, lies in the cleaning of the sloping sides and tops of the sides of each shallow drag flight bin 43 after the bin has been emptied and unloading has proceeded to the next bin and drag flight conveyor in the sequence. The propensity of RDF to wad, cling and hang up is well known, and it is quite certain that as each bin is emptied, some of the RDF, instead of falling to the bottom of the bin and being unloaded by the drag flight conveyor 44 for that bin 43 in that unloading sequence, will have hung up on the tops of the sloping bin sides particularly along the three ridges between the four shallow bins 43 shown in FIG. 2A, and some also perhaps along the rear sloping sides of all shallow bins and the outer sloping sides of the first and last bins. To remove this clinging and "hang up" RDF, the top of each bin side wall may be fitted with an air pipe 54 (FIG. 3), about half of a full cylindrical pipe, closed at the far end and fitted with an air pressure connection at the near end. Relatively high pressure air can be selectively injected into each pipe 54 by the operator at the fuel station control center 56.

The facility control center 56 has complete closed-circuit TV surveillance of each active storage unit 37, and when one shallow bin 43 has been emptied the operator can observe whether any RDF has hung up on the sloping sides or tops of the sides of that bin 43. If so, he can inject high pressure air through to the particular pipe 54 as necessary to free that clump of RDF, causing it to fall to the bin bottom where it will be removed in the next operating sequence for that bin. At this point the RDF is relatively loose and should blow free without difficulty. If a clump is particularly heavy or sticky and the air blast cannot free it, the operator will observe this and can dispatch a clean-up man to remove it before the next filling operation commences. The arrangement of these air pipes 54 along the sloping sides and ends of the first and second shallow bins 43 of an active unit 37 is shown in FIG. 3.

In a preferred arrangement, each of the conveyor 53 is a vibrating conveyor which receives the fluffed material from the associated doffing rolls 52, levels it out and feeds it in onto an electronic metering belt scale 55. The electronic metering belt scale 55 which, similarly, as the vibrating conveyor 53 is a commercially available device, such as may be obtained from Merrick Scale Mfg. Company, Passaic, N.J., e.g. Merrick 460 Weightometer Belt Scale. The belt scale can be set to control the feed rate from the doffing roll bin 51 wherein the bottom drag flight conveyor is controlled by a variable speed drive under the control of the belt scale 55. The belt scale 55 can be set at a desired feed rate for the particular boiler 38 which at any given time is being supplied with RDF from the storage unit 37 with which the belt scale 55 is associated. For example, if the boiler has a specified steam output requiring an RDF supply rate of 27 tons per hour, the belt scale 55 can be set for a rate of 54,000 pounds per hour, and it will regulate the speed of the drive of the drag flight conveyor 44 belt to achieve this rate. Associated with the metering scale belt conveyor 55 are two recorders, one of which will record the rate at which the RDF is being fed. While the metering belt scale may be set for a prescribed rate of 54,000 pounds an hour, the recorder will record any fluctuations either up or down from that optimum delivery rate. The second recorder on the metering belt scale 55 will continuously record the total amount of RDF fed in any given 24 hour period. Then, every 24 hours, the rate-fed chart and total volume feed chart may be changed and a new charts put on for the next 24 hours and which will give an accurate record of RDF feeding rate and total RDF actually fed to the boiler in the following 24-hour period.

From the belt scale conveyor 55, the RDF is delivered to a conveyor 57 leading into the upper end of a trommel dryer 58 located within a housing 59, which housing may be shared by the trommel dryer 58 for the next adjacent storage unit 37. Each of the trommel dryers 58 is a cylindrical drum placed generally horizontally but at a slight incline. The shell of the drum preferably has an array of small holes in an overall pattern for the purpose of dropping out any fines such as crushed glass, sand or the like, which may have traveled with the RDF fuel stream up to this point. The trommel drum is caused to rotate and has mixing lifter vanes or cleats which effect a final fluffing of the RDF, lifting it and dropping it through the air space in the trommel drum, and place it in the most loose and combustible condition possible before it goes on to the boilers.

In addition to the final cleaning and fluffing of the RDF, the trommel dryer 58 has the function of evaporating as much moisture as possible from the RDF before it goes to the boiler. Inasmuch as the system for the final metering and conditioning of the RDF is as close as practicable to the boiler installation, waste heat from the boilers can be utilized effectively for drying and heating the RDF in the trommel dryer 58 just before combustion. For this purpose, hot exhaust gas is conveyed by ducts 60 from the boilers 38 and is delivered to blend boxes 61 where the waste heat in the form of the exhaust combustion gases from the boilers is conditioned to the proper temperature which will be as high as practicable depending on the moisture condition of the RDF in the trommel 58 but low enough to avoid reaching the flash point of the most combustible materials in the RDF being dried. Such combustion gases are normally very low in oxygen content, but the ambient air in the trommel dryer 58 will have a normal oxygen content. In the blend boxes 61, the combustion gases may be mixed with sufficient ambient air under controlled conditions to lower the gas temperature below the flash point of the RDF while providing useful heat for lowering the moisture content of the RDF. The use of oxygen-deficient combustion gas as a major part of the drying air permits an overall higher drying air temperature in the dryer without undue risk of combustion in the dryer.

The amount of drying by use of combustion gas in the drying equipment cannot be stated precisely, since the amount of drying which is accomplished by this means depends to a very great extent on the moisture content of the RDF entering the dryer. The higher this moisture level is in the incoming RDF, the greater the reduction in the moisture content which is accomplished. Conversely, the lower the moisture in the incoming RDF, the less the drying effect. If the incoming RDF is very dry, little or no drying might be accomplished, and if this RDF is well mixed and contains little grit and glass fines, etc., the trommel dryer might be by-passed, as later stated. However, the drying part of the process and equipment described herein is still very important. When the drying is needed the most, that is when the most drying is accomplished.

Another important feature of the within described drying process is that not only is the heat-supplying medium, combustion gas, very oxygen-deficient and therefore permits higher and more efficient drying temperatures in the dryer, but also this gas is a free heat source. If it were not utilized for drying, it would just be vented to the atmosphere, and its heating and drying value lost.

Each of the blend boxes 61 may supply heated gas to a pair of the dryer trommels 58, there being a duct 62 from the blend box 61 to each of the respective trommels 58 served by the blend box 61.

For removing incombustible fines, separated out in the trommel dryers 58, there may be associated under each of the trommels 58 a collection conveyor 63 leading to a collector bin 64 from which the collected fines may be disposed of in any manner desired. Each of the trommels 58 may be enclosed within a hood or casing 65 of ample size for concentrating the heat and dust of that trommel within reasonable limits. For removing the spent heating gas and dust from the casing 65 in each instance, an exhaust duct 67 may be provided adjacent to the discharge end of the trommel 58. The exhaust duct 67 may lead to a bag house or collection point schematically illustrated at 68.

Each of the trommel dryers 58 discharges its RDF load to a transverse conveyor 69 which leads therefrom to a delivery conveyor 70 underlying the conveyor 57 associated with that trommel dryer, and continues on to deliver the conditioned RDF to either one of a pair of spaced parallel conveyors 71 and 72.

If the RDF is in a satisfactory state for combustion after leaving the doffing roll metering bin 51 in any instance, so that drying in the associated trommel dryer may not be necessary, the conveyor 57 is adapted so that the RDF may be diverted directly from the associated metering belt scale conveyor 55 to the conveyor 70. For this purpose, there may be provided at the upstream end of conveyor 57 an optional, selective dropout 73 so that the RDF may drop down onto the conveyor 70 for direct boiler supply, bypassing the trommel dryer 58. This may be an occasional occurence when the RDF supplied from the intermediate storage units 37 is of low enough moisture content and adequate fluffiness for the intended fuel purposes.

In a preferred arrangement, the RDF from any one of the storage units 37 may be supplied to any one of the boilers 38. To this end, each of the boilers 38 has leading thereto a separate horizontal boiler supply conveyor. For example, a supply conveyor 74 leads to the boiler 38$a$ which in this instance stands first in the row of boilers 38 in the installation. A horizontal supply conveyor 75 leads to the next boiler 38$b$. The arrangement is such that the conveyor 74 underlies the conveyor 75. Similarly, a horizontal conveyor 77 leading to the boiler 38$c$ underlies a horizontal supply conveyor 78 which leads to the boiler 38$d$.

Each of the conveyors 70 is adapted to deliver selectively to either of the associated transfer conveyors 71 and 72, and each of the transfer conveyors 71 and 72 is in association with two different ones of the supply conveyors 74 to 78. For example, in each instance the conveyor 71 is adapted to deliver RDF to either of the lower supply conveyors 74 or 77. On the other hand, the delivery conveyor 72 in each instance is adapted to deliver to either of the upper delivery conveyors 75 or 78. This selective delivery is effected by means of respective pants-leg diverters or splitters 79, there being one of the pants-leg or flop-gate diverters which divert the fuel stream from either one of the transfer conveyors 71 and 72 to either of the boiler supply conveyors with which that transfer conveyor is associated. These flop-gate stream diverters are, as is well known in the art, adapted to selectively divert the stream of material to either of the two associated conveyors. That is, the stream of RDF from the conveyors 71 is adapted to be diverted to either of the lower conveyors 74 or 77. On the other hand, the diverters 79 for each of the conveyors 72 are adapted to have the streams of RDF therefrom diverted to either of the upper conveyors 75 or 78. For effecting selective discharge from the conveyor 70 in each instance to either of the delivery conveyors 71 or 72, there is associated with the discharge end of the conveyor 70 in each instance a selector extension conveyor 80 which is longitudinally movable coaxially relative to its associated conveyor 70 so that when it is desired to discharge from the conveyor 70 to the conveyor 71, the shiftable selector or shuttle conveyor 80 is backed off from the associated conveyor 70 and the conveyor 70 will then discharge to the transfer conveyor 71. On the other hand, if it is desired to have the conveyor 70 deliver to the transfer conveyor 72, the associated shuttle conveyor 80 is moved into position where in the conveyor 70 discharges onto the shuttle conveyor 80 which in turn discharges onto the conveyor 72. Through this arrangement, there is complete versatility as to which of the boilers 38 may be supplied at any given time from any of the storage units 37.

This supply flexibility is quite advantageous in a plural boiler installation where at any given time, any one of the boilers may be maintained in standby condition, or may be taken out of service for reconditioning or any other reason. Similarly, any one of the supply units 37 may be maintained in a standby condition, or can be shut down for reconditioning, or the like. The remaining three supply units 37 will at all times be in a relationship to maintain a continuous, uniform supply of RDF to whichever three of the boilers 38 in the boiler installation may then be operating.

Each of the supply conveyors 74, 75, 77 and 78 discharges to infeed means to the associated boiler, comprising in a desirable arrangement one of the supply conveyors, e.g. 74, (FIGS. 2B, 4 and 5) which discharges onto a vibrator conveyor 81 having longitudinal material stream confining side walls 82 and adapted for moving the fluculant, fluffy RDF in a uniform stream layer toward the associated boiler. On the vibrating conveyor 81, the stream of material is desirably split into two streams by means of a splitter 83 which may comprise an inclined edge 84 sloping from the floor of the conveyor 81 in a downstream direction so that stringy matter in the RDF will not hang up. For example, stringy pieces of plastic, fabric or strand material that may not have been fully shredded may be transported in the stream of material and tend to hang up on the stream splitter 83, but by virtue of the upward sloping edge 84 of the splitter, any material that may tend to hang up on the splitter will be gradually pushed up by the oncoming stream of material and will then normally slide off or will be pulled off of the edge 84 on one side or the other into one or the other of the split-off streams by the mass or RDF which is continuously passing the splitter 83.

Where additional divisions of the fuel stream are desired, as where multiple RDF fuel ports 88 are desired for a large industrial boiler, generating perhaps 300,000 pounds of steam per hour, and which might require 6 RDF feed ports 88, the discharge from the two bifurcated ends of the first splitter vibrator conveyor 81 can be fed onto a second set of vibrator conveyors 86 which may split the once-divided fuel stream into three additional fuel streams each, for a total of six fuel streams, all relatively uniform, one for each of the 6 RDF fuel ports of the boiler. In the embodiment shown, each of the uniform 6 RDF streams can then be dropped into 6 feed chutes 87 which drop the RDF directly in front of the 6 RDF firing ports 88 of each boiler. The split streams of RDF dropped in front of fuel ports 88 may then be blown by means of over-fire air nozzles 89 through the fuel injection ports 88 in the boiler front wall. Preheated air is supplied from a preheater 89a through ducts 89b which deliver the air to manifolds 89c from which the nozzles 89 are fed.

Instead of the upward-sloping self-cleaning edge 84 for the RDF stream splitter 83 on the vibrating conveyor 81, an arrangement as shown in FIG. 6 may be utilized wherein the stream splitter 83' associated with the vibrating conveyor 81' may have at its upstream end a freely rotating generally vertical roller 90 which will freely roll in the direction of major RDF material pressure thereagainst. In a particular, if any stringy material tends to hang up on the roller 90, the material will tend to be pulled along in either of the split streams and the roller 90 will freely rotate in the direction of the pull on the stringy material and thereby permit the stringy material to clear the splitter. It will be appreciated, of course, that the roller 90 should be higher than the side walls 82' of the vibrating conveyor 81', similarly as the splitter 83 is desirably higher than the side walls 82 in FIGS. 4 and 5.

In a modified version, the hang-up clearing means at the upstream end of the splitter 83'' as shown in FIG. 7, may comprise a driven vertical roller 91 which is adapted to be driven by means of a driver such as a motor 92 drivingly connected to the roller 91 by transmission gearing 93. Thereby the hang up clearing roller 91 is adapted to be driven rotatably toward a doctor or clearing blade comb 94 mounted fixedly on the splitter 83'' and having a scraper edge 95 extending tangentially toward the perimeter of the roller 91. Desirably the roller 91 may have short radially extending projections 97 located at intervals along the length of the roller perimeter and in circumferential rows spaced along the length of the roller. These projections 97 positively impel toward the comb 94 and thus to one of the divided RDF streams, any stringy material which may tend to hang up at the upstream end of the splitter 83''. Means for clearing the projections 97 past the comb 94 may comprise suitable slots 98 in the scraper edge portion of the comb 94.

In FIG. 8, in a modified version, the splitter 83'' has a hang-up clearing roller 99 which has sawtooth projections 100 on its periphery which extend solidly the full effective length of the roller 99. This roller is driven by motor means 92' similarly as the motor 92 in FIG. 7. A spring loaded wiper 101 acts to clear the projections 100. Otherwise the divider of FIG. 8 is similar to the divider 83'' in FIG. 7.

Steam generated in the boilers 38 may be delivered, as shown by directional arrows, to a turbine generator building for operating electrical generators, the electric power from which may pass through an electrical switching station and then on to the electrical distribution grid for the electrical utility or other user of the generated electrical power.

Exhaust gas from the boilers 38 may be directed to what is identified in FIG. 2B as an exhaust gas clean-up area and which will be equipped with environmentally efficient flue gas cleaning equipment.

Means may be provided for cofiring with the RDF, fossil fuel which may be coal, coke, oil or gas supplied from supply sources such as tanks or bins or silos 102 (FIG. 2B) connected as indicated with the boilers 38. Desirably there will be one of the supply units 102 for each of the boilers. Each of the supply units 102 may be furnished with the appropriate fossil fuel through delivery means 103 from a suitable source. Such auxiliary fuel capability for this system assures that the operating boilers 38 always have adequate and highly efficient fuel supply even if there may be for any reasons fluctuation in the supply volume or BTU quality of the RDF fuel supply. It will usually be desirable to cofire at least a minor proportion of the auxilary fuel supply with the RDF at all times to accomplish most efficient combustion in the boilers and meet steam output requirements of the boiler most uniformly and dependably. Here again a high quality of RDF is important, since the higher the quality of the RDF, the more effective is the cofiring of supplemental fossil fuel in achieving desirable uniform flame conditions in the boiler and thus achieving critical uniform steam output from the boiler.

An RDF storage building 104 (FIG. 9) which may be of large primary or reserve storage size such as the RDF reserve storage building 27 in FIG. 1, or may be of a smaller intermediate storage size such as the storage units 37, has certain features which show improvement over the forms of such buildings disclosed in U.S. Pat. No. 4,358,237, to which reference was made hereinbefore. In the building 104 a sturdy frame 105 supporting an enclosure including a roof 107 has a roof-supported RDF in-feed longitudinal conveyor 108 from which incoming RDF to be stored is discharged onto a divider 109. The divider 109 diverts substantially one half of the RDF onto one endless transfer conveyor 110 directed in one lateral direction and diverts the remaining half of the RDF onto an endless transfer conveyor 111 which runs in the opposite lateral direction. From the conveyor 111 the RDF is discharged onto a building loading conveyor 112, and from the transfer conveyor 110 the RDF discharge is onto a building loading conveyor 113 on the opposite side of the building. The conveyors 112 and 113 shuttle back and forth together along the length of the building, maintaining the same relative position along the length of the storage space within the building 104 and thus effect the substantially equal loading of the building from end-to-end, starting at one end and completing at the opposite end, in substantially the manner taught in U.S. Pat. No. 4,358,237. The advantage here is that instead of directing the incoming material selectively to either one of the side loading conveyors 112 and 113, the material is substantially equally simultaneously delivered to both of them so that the loading throughout the width of the bin space in the building 104 is effected substantially equally.

Another feature of the building 104 is that the full width of the building above the floor 114 is utilized for storage capacity. A sloping roof surface 115 along the unloading side of the building 104 shunts the RDF material falling from building loading conveyor 112 away from the side takeaway conveyor 117, and assures that the side takeaway conveyor 117 cannot become overloaded during filling of building and start slipping under its load, received from cross unloading conveyors 118 or pushed onto it by a pusher means 119 positioned under a shed roof 120 during the RDF filling phase of operations. The idler ends of the cross unloading conveyors are protected by a small floor shield 121.

The cross unloading conveyors 118 are positioned in shallow trenches in the storage building floor, and are operated sequentially starting at the same end of the building as that at which loading of the building started, as taught in U.S. Pat. No. 4,358,237.

The first cross unloading conveyor 118 will be located immediately adjacent to the inner side of the end wall at the end of the storage building where the building filling phase of operations started, and where the unloading phase of operations will commence. This first cross-conveyor to commence operating during the unloading phase will also be protected by a sloping roof surface 122 similar to the roof surface 115 protecting the takeaway conveyor 117, and assuring that the first cross unloading conveyor to commence unloading will not become overloaded during the building filling phase of operations and slip or be stopped under its initial load. When the RDF unloading phase first commences, the first cross unloading conveyor will commence to be loaded by the pusher means 119 commencing to operate from under its protecting shed roof 120. The upper and lower edges of the roof surface 122 protecting the first cross unloading conveyor are indicated by broken lines 123.

The takeaway conveyor 117 in the large storage building of FIG. 9 corresponds to the takeaway conveyors 45 of the smaller storage units 37' in FIG. 2A.

The protecting or shield roof surfaces 115 and 122 correspond generally to the protecting or shield roof surfaces of the smaller storage units 37, in FIG. 2A, the lower edges of which protecting or shield roof surfaces are shown as 48 in FIG. 2A.

Although a plural boiler arrangement has been particularly described, it will be appreciated that for installations in which a single boiler may suffice to meet the steam supply requirements and consume the available RDF supply, a single or perhaps a pair of storage units 37 and associated final RDF processing systems may suffice, but the final RDF processing between the storage unit and the boiler to be supplied may be substantially the same as described in respect to the processing means and method described for each of the storage units 37.

It will be understood that variations and modifications may be effected without departing from the spirit and scope of the novel concepts of this invention.

We claim as our invention:

1. A uniform, high quality refuse derived fuel (RDF) supplying system for maintaining a plurality of industrial boilers operating continuously at peak efficiency, and comprising:
   a plurality of RDF storage units at least equal in number to the plural number of boilers to be supplied with RDF;
   means for loading RDF from a source into said storage units;
   and means for selectively delivering the RDF from any of said storage units to any of the boilers.

2. A system according to claim 1, wherein said storage units are located in alignment, and comprising a dual conveyor system operative for selectively loading any of said storage units.

3. A system according to claim 1, wherein said means for selectively delivering the RDF comprises a doffing roll metering bin for each of said storage units and into which the RDF is delivered from the storage unit associated with it and in which the RDF is worked to a desirable fluffiness, means for metering the RDF from each bin to the exact firing rate being called for by the boiler operator, and means for then moving the RDF from said metering means on toward the boilers.

4. A system according to claim 3, including conveyor means for transporting the fluffed RDF material from any one of said moving means selectively to any one of said boilers.

5. A system according to claim 1, wherein said means for selectively delivering the RDF comprises trommel dryer means in which the moisture content of the RDF is lowered for combustion efficiency, and the RDF receives final blending and mixing for maximum uniformity.

6. A system according to claim 1, wherein said means for selectively delivering the RDF comprises doffing roll metering bin means to which the RDF is directed from the storage units, trommel drying means to which the RDF is adapted to be selectively directed for blending for uniformity and lowering of the moisture content, and conveyor means for directing the dried RDF from the trommel dryer means to the boilers.

7. A system according to claim 1, wherein said means for selectively delivering the RDF to the boilers comprises conveyor means having at each of said boilers vibrating conveyor means including a splitter device for dividing the RDF stream into a plurality of uniform RDF streams for delivery to respective RDF fuel feed ports of the associated boiler.

8. A uniform, high quality refuse derived fuel (RDF) supplying system for maintaining an industrial boiler operating continuously at peak efficiency, and comprising:
an RDF storage unit having a capacity for continuously supplying the boiler with RDF;
means for loading RDF from a source into said storage unit;
and means for selectively delivering the RDF from the storage unit to the boiler at a uniform, closely-controlled feed rate, including doffing roll metering bin means for fluffing the RDF as received from the storage unit, trommel dryer means for drying the RDF and adapted to receive the RDF from the doffing roll metering bin means, boiler feed conveyor means leading to the boiler from the trommel dryer means, and means for selectively shunting the RDF directly from the doffing roll metering bin to the boiler feed conveyor means and bypassing the trommel dryer means.

9. A system according to claim 8, including means for supplying boiler-derived heat to said trommel dryer means.

10. A system according to claim 8, wherein said boiler feed conveyor means includes vibrating conveyor means adjacent to the boiler and having RDF stream splitter means for dividing the RDF stream into a plurality of uniform fuel streams at the boiler.

11. A system according to claim 10, wherein said vibrating conveyor splitter means has an upstream end provided with a rotary anti-clogging device.

12. A high quality refuse derived fuel (RDF) supplying system for maintaining a plurality of industrial boilers operating at peak efficiency, and comprising:
providing a plurality of RDF storage units at least equal in number to the plural number of boilers to be supplied with RDF;
loading RDF from a source into said storage units;
and selectively delivering the RDF from any one of said storage units to any one of the boilers.

13. A system according to claim 12, which comprises selectively delivering the RDF into a doffing roll metering bin means and in the doffing roll metering bin means working the RDF to a desirable fluffiness, and then metering and moving the RDF on toward the boilers.

14. A system according to claim 13, which includes transporting the metered fluffed material from the doffing roll metering bin means selectively to any one of the boilers.

15. A system according to claim 12, which comprises drying the RDF in trommel dryer means and thereby effecting lowered moisture content, and effecting a final blending of the combustible components of the RDF for maximum uniformity and combustibility.

16. A system according to claim 12, which comprises directing the RDF to doffing roll metering bin means from the storage units, selectively directing the RDF from the doffing roll metering bin means to trommel drying means and there lowering the moisture content of the RDF, and then directing the dried RDF from the trommel dryer means to the boilers via conveyor means.

17. A system according to claim 12, which comprises for each of the boilers subjecting the RDF to vibrating conveyor means and splitting and dividing the RDF stream into a plurality of uniform streams for delivery to each fuel feeding port of the associated boiler.

18. A system according to claim 12, which comprises receiving relatively low combustible grade residential raw waste materials in one conveyor, receiving higher combustible grade industrial waste on another conveyor, combining the two grades of waste materials on a shaker or vibrating conveyor, progressively processing the combined wastes including removal of noncombustible materials, and transporting the combustible materials from the combined wastes selectively to reserve storage facility or to said plurality of RDF storage units.

19. A system according to claim 18, wherein said processing comprises of mixing and sorting said materials in a large rotary trommel, shredding the larger combustible materials, air classifying the smaller components of the materials, and combining the combustible materials from the air classifying and the shredding into a common stream leading to the reserve storage area or to the plurality of RDF storage units.

20. A high efficiency refuse derived fuel (RDF) supplying system for supplying a high quality, industrial grade of RDF, of maximum uniformity, suitable for firing in high efficiency boilers, comprising:
receiving relatively lower combustible grade residential raw refuse in one conveyor, receiving relatively higher combustible grade commercial and industrial refuse in another conveyor, delivering the refuse from both of said conveyors to a vibrating conveyor and there blending and co-mingling the refuse materials from the two conveyors in desired proportions;
transferring the co-mingled waste materials to a sorting section for removal of large noncombustible items;
from the sorting section transferring the materials to a ripper means;
from the ripper means transferring the material into a mixing and rotary sorting trommel;
from the trommel directing small undersize particles to a sorting screen;
from the sorting screen directing combustible materials into an air classifier;
from the trommel directing larger size combustible materials into a shredder;
and from the shredder and the air classifier combining the combustible materials and directing the combustible materials selectively to a reserve storage facility or to a final RDF processing area for metering, drying and further mixing, and blending and then transferring to an industrial boiler.

21. A system according to claim 20, comprising in said final RDF processing area providing a plurality of RDF storage units at least equal in number to a plurality of the high efficiency boilers to be suplied with RDF, loading the RDF into said storage units, and selectively delivering the RDF from anyone of said storage units to anyone of the boilers.

22. A system according to claim 20, which comprises providing in said storage facility or in said final RDF processing area a storage building including a roof, providing in the building a roof supported longitudinal RDF in-feed conveyor, providing endless transfer conveyors extending from each side of the in-feed conveyor, providing building loading conveyors and discharging onto the building loading conveyors from the transfer conveyors, and uniformly simultaneously discharging from said in-feed conveyor onto the transfer conveyors at both sides of the in-feed conveyor.

* * * * *